United States Patent [19]

Burke, Jr.

[11] 4,364,000

[45] Dec. 14, 1982

[54] LIMITED ROTATION DEVICE HAVING TWO DEGREES OF FREEDOM

[75] Inventor: Edward F. Burke, Jr., Reading, Mass.

[73] Assignee: MFE Corporation, Salem, N.H.

[21] Appl. No.: 785,019

[22] Filed: Apr. 6, 1977

Related U.S. Application Data

[63] Continuation of Ser. No. 608,829, Aug. 29, 1975, abandoned.

[51] Int. Cl.³ .............................................. H02K 33/00
[52] U.S. Cl. .................................... 318/128; 310/36; 350/6.5; 335/229
[58] Field of Search .................... 350/6; 318/119–132; 310/25, 36–39; 178/7.6; 250/235; 335/229, 230

[56] References Cited

U.S. PATENT DOCUMENTS

| | | | |
|---|---|---|---|
| 3,642,344 | 2/1972 | Corker | 310/36 X |
| 3,678,308 | 7/1972 | Howe | 310/36 |
| 3,952,217 | 4/1976 | Rawlings | 335/230 X |

*Primary Examiner*—Donovan F. Duggan
*Attorney, Agent, or Firm*—Cesari & McKenna

[57] ABSTRACT

A device for reciprocally rotating an output element such as a scanning mirror by means of an electric motor employs a two-degree-of-freedom suspension in which the motor armature is constrained by a first torsional suspension and the output element is supported from the armature by an independent second suspension. The resonant frequency of the armature and its suspension is substantially equal to the resonant frequency of the output element and its suspension.

9 Claims, 2 Drawing Figures

LIMITED ROTATION DEVICE HAVING TWO DEGREES OF FREEDOM

This is a continuation, of application Ser. No. 608,829 filed Aug. 29, 1975, now abandoned.

BACKGROUND OF THE INVENTION

A. Field of the Invention

This invention relates to a system for reciprocally rotating an output element. Specifically it relates to a two-degree-of-freedom system in which an alternating driven torque is applied to a relatively massive driven element such as a motor armature to provide a relatively large angular excursion in an output element elastically coupled to the driven element.

While the invention is useful in a number of applications it is directed specifically to an optical scanner. The scanner is used to sweep a light beam back and forth over an object and the reflected or transmitted light from the object is sensed to ascertain a characteristic of the object. For example, at the checkout counter in a retail store, a scanner can be used to sweep a light beam back and forth over a bar code imprinted on each package to provide information relating to the contents of the package. The light reflected from the bar code is sensed to ascertain the information contained in the code.

B. Prior Art

Ordinarily, an optical scanner is driven by means of a limited-rotation electric motor, for example a motor of the type used to drive a recording pen in a strip chart recorder. A mirror is affixed to the motor shaft and the motor is driven at a frequency corresponding to the desired scanning rate, so that the mirror reflects a light beam at the desired rate onto the object to be monitored.

A particularly desirable motor for this application is described in U.S. Pat. No. 3,177,385. In this motor the magnetic flux in the air gap is perpendicular to the direction of the armature movement. The motor is characterized by the combination of a relatively high efficiency with a relatively large angular excursion. On the other hand, the armature is subject to unbalancing magnetic forces that tend to tilt it or radially displace it into contact with the stator poles of the motor. These unbalancing forces are contained by ball bearings that support the armature shaft at opposite ends of the motor. However, ball bearings have a relatively short life span when subjected to rapid reciprocal motion, e.g. at cyclic rates of 400 Hz or more. Torsional armature supports are therefore sometimes substituted for ball bearings to avoid the problem of bearing wear. Indeed if it is not overstressed, a torsional support has an essentially unlimited life span.

But if a torsional support is stiff enough in the bending mode to prevent tilting or radial displacement of the armature in a perpendicular-flux motor, it will be so stiff in the torsional mode that it will be over-stressed when the armature is rotated through the angular excursions required for such applications as optical scanning. The support will therefore fail after a relatively short life span. The principal object of the present invention is to provide a reciprocating scanner that can include a perpendicular-flux motor and yet have an armature support characterized by a relatively long life span.

SUMMARY OF THE INVENTION

In accordance with my invention the motor armature and the output element are combined in a suspension system that has two degrees of freedom. The armature is supported by a torsional member tht is sufficiently stiff to avoid bending, while the output element is supported from the armature by an independent torsional suspension that has sufficient compliance to permit a large angular excursion with respect to the armature.

The output element, e.g. a mirror in an optical scanner, resonates with its torsional suspension at a frequency, $f_a$, which is substantially equal to the frequency of operation. Preferably the resonant frequency, $f_b$, of the motor armature and its torsional suspension is approximately the same, as discussed in detail below. Since the output element usually has a very low moment of inertia as compared with that of the motor armature this is readily accomplished with a suspension for the output element that is highly compliant relative to the armature suspension.

A two-degree-of-freedom system is described by J. P. Den Hartog in "Mechanical Vibrations" (4th Ed, 1962), McGraw-Hill. A system of this type has two resonances, i.e. poles in the function relating output amplitude to input force. The terms "resonance" and "resonant" usually mean operation at these poles. However, I call such resonances "system resonances" to distinguish them from "individual" resonant frequencies corresponding to hypothetically isolated pairs of components in the system. The frequencies $f_a$ and $f_b$ are thus individual resonant frequencies in the context of the present description. These frequencies are both between the two system resonant frequencies.

Of particular importance in connection with the present invention are two characteristics resulting from the choices of the frequencies $f_a$ and $f_b$. The first of these concerns the effect of $f_a$ on the relative amplitudes of vibration of the two masses, i.e. the motor armature and the output element. Beginning on page 87 of the above-cited book, Den Hartog describes a dynamic vibration absorber that protects a system against the effects of resonant vibration of a "main mass" subjected to a periodic vibratory force. An "absorber mass" is suspended from the main mass by means of a compliant suspension and the resonant frequency of the absorber mass is made equal to the frequency of the vibratory force. With this arrangement, the main mass has zero amplitude of vibration while the absorber mass has a finite amplitude.

Although I use this principle for a different purpose, i.e. to obtain a substantial rotational amplitude from a scanning mirror or the like, the operation of the principle is the same. That is, I select $f_a$ to be close to or equal to the desired frequency of motion of the output element. Thus, even though a considerable driving force is applied to the motor armature at that frequency, the armature has an essentially zero amplitude of motion (i.e. angular excursion), while the output element suspended from the armature can have a substantial amplitude. With no armature motion, the armature suspension is subjected to no torsional stress. It can therefore be as stiff as needed to avoid tilting or radial displacement of the armature, without being over-stressed because of system operation.

It is important to bear in mind the distinction between the system resonant frequencies and the resonant frequency $f_a$ of the output element and its suspension. A number of other scanners are driven at system resonance frequencies. Indeed, they use regenerative feedback that ensures operation at those frequencies, an example of such an arrangement being described in my co-pending application Ser. No. 590,254 filed June 25, 1975, assigned to the same assignee as the present invention. At a system resonance, the amplitudes of motion of both the motor armature and the output element are at a maximum. At the frequency $f_a$, on the other hand, both amplitudes are at or near their minimum values. The armature amplitude is zero as discussed above. The amplitude of the output element, however, is not zero and thus is proportional to the magnetic driving force applied to the armature. Accordingly, one can easily obtain the amplitude needed for such applications as optical scanning.

One can use a feedback arrangement to force the frequency of the motor current to coincide with the frequency $f_a$. However, the system can also be driven in open-loop fashion and this will be more desirable in many cases.

More specifically, in a system operating at a system resonance, the resonance is usually characterized by a very high "Q", so that if the driving frequency differs from the resonant frequency by even a small amount, the output amplitude suffers a drastic decrease. In an open-loop arrangement, such a frequency difference can result, for example, from the effect of temperature change or aging on the resonant frequency. Closed-loop operation is therefore necessary to force the driving frequency into equality with the resonant frequency.

On the other hand, with the present system, if the armature resonant frequency $f_b$ is equal to or close to the frequency $f_a$, the output amplitude will have a relatively broad and symmetrical minimum at or close to the frequency $f_a$. Therefore, in open-loop operation, if the motor is driven at a frequency nominally equal to $f_a$, there will not be an unduly large change in output amplitude as a result of the small changes in the driving frequency or the frequency $f_a$ to be expected in normal operation.

More specifically, if the frequencies $f_a$ and $f_b$ are equal, the minimum output amplitude will occur at a frequency $f_m$, above $f_a$, as given by $$f_m^2 = f_a^2 \left( 1 + \frac{k}{K} \right). \tag{1}$$

where;
  k is the spring constant of the torsional support for the output element, and
  K is the spring constant of the torsional support for the motor armature.

If the ratio k/K has a value of 0.1, for example, $f_m$ will be about 2.5% higher than $f_a$. This is sufficiently close to $f_a$ in many applications to avoid severe excursions in output amplitude as a result of normal changes in the operating frequency and in $f_a$. Alternatively one might arrange the system parameters so that the operating frequency is either at $f_m$ or between $f_a$ and $f_m$. In either case, the motor armature will have a non-zero amplitude of motion, but, depending on the driving torque, it need not be beyond the limit imposed by the life characteristics of the torsional support for the armature.

I prefer, however, to arrange the mechanical parameters to make $f_m$ coincide with $f_a$. It can be shown that this condition exists if $$f_b^2 = \frac{f_a^2}{1 + k/K} \tag{2}$$

That is, when the condition of formula (2) is met, the output amplitude is at a minimum at the same frequency that the armature amplitude is zero. Therefore, the curve relating output amplitude to frequency will be horizontal at the design input frequency of the device. The output amplitude will thus undergo minimal variation as a result of drift in driving frequency or in the parameters of the mechanical part of the system. Typical amplitude error sensitivity factors are on the order of 1.0 for a device tuned in this fashion, that is, a 1% frequency error causes an approximately 1% amplitude error.

With open-loop operation, one can make the system operate exactly at a frequency set by the other elements in the overall system in which the scanner is incorporated. Such operation also eliminates the need for the motion-sensing transducer required in closed-loop systems.

The foregoing analysis is derived in terms of a lossless mechanical system. System losses due to such factors as windage and internal friction cause the analysis to be an approximation which, however, does not depart materially from actual operation.

DESCRIPTION OF THE PREFERRED EMBODIMENT

Figure 1:
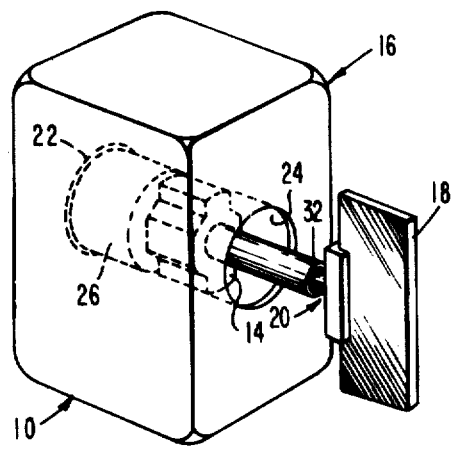
FIG. 1 is a perspective view of an optical scanner embodying the invention.

As shown in the drawings, an optical scanner embodying the invention includes a limited-rotation motor 10 whose stator 12 and armature 14 are enclosed in a housing 16. A mirror 18 is supported from the armature 14 by means of a torsional suspension generally indicated at 20. At opposite ends of the stator 12, the motor 10 includes a pair of apertured bearing supports 22 and 24. In other applications of the motor the supports 22 and 24 contain ball bearings that support the motor armature by means of an armature shaft not used in this application of the motor. Further the support 24 is unused in the scanner and can be omitted. The support 22, on the other hand, is used to support the armature 14 by means of a torsional suspension.

Figure 2:
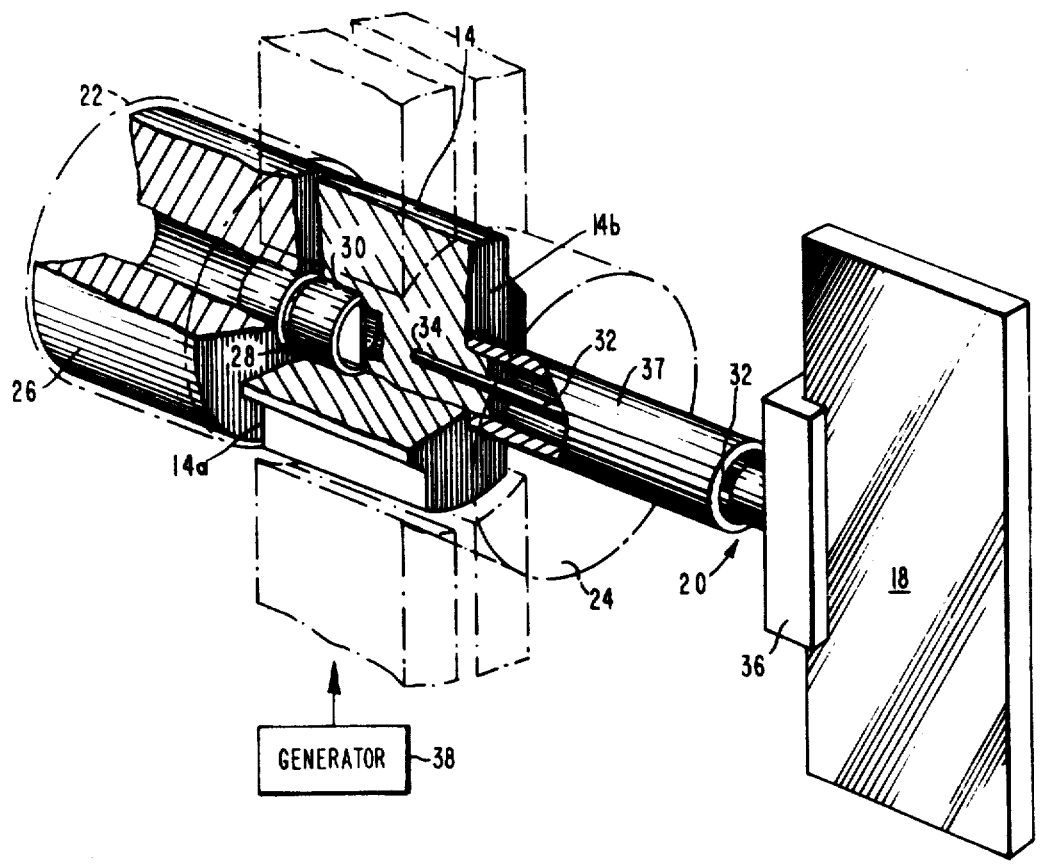
FIG. 2 is an enlarged cutaway view showing the suspensions in greater detail.

More specifically, as shown in FIG. 2, a sleeve 26, fastened within the support 22 by means of a set screw (not shown), contains one end of a torsional suspension generally indicated at 28. The other end of the suspension 28 is fixed within a boring 30 in the rear end 14a of armature 14. In the preferred embodiment of the invention the suspension 28 is a flexural pivot marketed by Bendix Corporation under the trademark "Free-Flex".

As best seen in FIG. 2, the torsional suspension 20 includes a thin shaft 32, one end of which is soldered in a hole 34 in the front end 14b of the armature. At its other end the shaft 32 carries a bracket 36 that holds the mirror 18. A rigid tube 37 is attached at one end to the armature end 14b. It extends almost all the way to the bracket 36, with a small clearance around the shaft 32. The tube 37 prevents undue bending of the shaft 32 should the mirror 18 be accidentally subjected to strong lateral forces.

The output element of the system comprises the mirror 18 and the bracket 36. These parts have a combined low moment of inertia about the rotational axis of the system, i.e. the axis of the suspension 28 and shaft 32. They thus resonate with the shaft 32 at a relatively high frequency $f_a$, even though the shaft 32 has sufficient compliance to enable it to rotate through a substantial angle, e.g. 10 degrees, without being unduly stressed.

With its relatively large moment of inertia, the armature 14 resonates with the relatively stiff torsional suspension 28 at a frequency $f_b$ that is substantially equal to $f_a$. Specifically, as seen from formula (2) above, $f_b$ is preferably lower than $f_a$ by the factor of $\sqrt{1+k/K}$, and thus is within a few percent of $f_a$.

The motor 10 is energized by a generator 28 which includes a frequency-determining portion e.g. a crystal controlled oscillator. The oscillator sets the generator output frequency at substantially $f_a$ so as to provide the operating characteristics described above.

With the use of two independent suspensions for the armature and mirror, one can select each suspension with a view to its own requirements. The armature suspension 28 can be selected for stiffness in the bending mode, coupled with a short distance between the armature and the sleeve 26 as in the illustrated pivot. The mirror suspension 20, on the other hand, which is not subject to serious bending stresses, can be selected for high compliance per unit length. In combination, therefore, both suspensions contribute to a short overall length for the scanner.

As will now be apparent, there is described in the foregoing specification, a specific embodiment of a limited rotation device which has two degrees of freedom. It will be apparent, however, that modifications can be made to the specifically disclosed embodiment and that such a modified version may have all or some of the desirable features and advantages of the specifically described system. Therefore, it is an object of the appended claims to cover all such variations and modifications as come within the true spirit and scope of this invention.

What I claim as new and desire to secure by Letters Patent of the United States is:

1. A two degree of freedom, limited rotation system for reciprocally rotating an output element, said system comprising, in addition to said output element,
   A. a driven element,
   B. a first torsional support for said driven element,
   C. a second torsional support independent of said first support for supporting said output element from said driven element,
   D. said system having two system resonant frequencies, said output element and said second support having an individual resonant frequency $f_a$ that is unequal to either of said two system resonant frequencies, said driven element and said first support having an individual resonant frequency $f_b$ that is unequal to either of said two system resonant frequencies, and
   E. means for driving said driven element at a driving frequency that is substantially equal to the individual resonant frequency $f_a$ of said output element and said second support, whereby said driven element has an essentially zero amplitude of motion while said output element may have a substantial amplitude of motion.

2. The system defined in claim 1 in which the individual resonant frequency $f_b$ of said driven element and said first support is substantially equal to the individual resonant frequency $f_a$ of said output element and said second support, whereby the effect of variations in the driving frequency of said drive means on the amplitude of motion of said output element is reduced.

3. The system defined in claim 1 in which said driving means drives said output element in an open-loop fashion and includes a frequency-determining element that sets the driving frequency substantially equal to the individual resonant frequency $f_a$ of said output element and said second support.

4. A two degree of freedom, limited rotation system for reciprocally rotating an output element, said system comprising, in addition to said output element,
   A. an electromagnetic motor having a stator and an armature, said motor being of the type in which the armature is subject to magnetic forces tending to tilt it or radially displace it against the stator,
   B. a first torsional support for said armature, said first support having sufficient stiffness to prevent said armature tilting or radial displacement,
   C. a second torsional support independent of said first support for supporting said output element from said armature,
   D. said system having two system resonant frequencies, said output element and said second support having an individual resonant frequency $f_a$ that is unequal to either of said two system resonant frequencies, said armature and said first support having an individual resonant frequency $f_b$ that is unequal to either of said two system resonant frequencies, and
   E. means for energizing said motor so that said armature is driven at a driving frequency that is substantially equal to the individual resonant frequency $f_a$ of said output element and said second support, whereby said armature has an essentially zero amplitude of motion while said output element may have a substantial amplitude of motion.

5. The system defined in claim 4 in which the individual resonant frequency $f_b$ of said in which the individual resonant frequency f of said armature and said first support is substantially equal to the individual resonant frequency $f_a$ of said output element and said second support, whereby the effect of variations in the driving frequency of said motor energizing means on the amplitude of motion of said output element is reduced.

6. The system defined in claim 5 in which said motor energizing means energizes said motor in an open-loop fashion and includes a frequency-determining element that sets the driving frequency substantially equal to the individual resonant frequency $f_a$ of said output element and said second support.

7. A two degree of freedom, limited rotation system for reciprocally rotating an output element, said system comprising, in addition to said output element,
   A. a driven element,
   B. a first torsional support for said driven element,
   C. a second torsional support independent of said first support for supporting said output element from said driven element, and
   D. said system having two system resonant frequencies, said output element and said second support being characterized in that they together have an individual resonant frequency $f_a$ that is unequal to either of said two system resonant frequencies, said driven element and said first support being characterized in that together they have an individual resonant frequency $f_b$ that is unequal to either of said two system resonant frequencies but substantially equal to the individual resonant frequency $f_a$ of said output element and said second support.

8. The system defined in claim 1 in which said first torsional support is characterized by a spring constant K and said second torsional support is characterized by a spring constant k and in which the individual resonant frequency $f_b$ of said driven element and said first support is related to the individual resonant frequency f of said output element and said second support substantially by the relationship $$f_b^2 = \frac{f_a^2}{1 + k/K}.$$

9. The system defined in claim 4 in which said first torsional support is characterized by a spring constant K and said second torsional support is characterized by a spring constant k and in which the individual resonant frequency $f_b$ of said armature and said first support is related to the individual resonant frequency $f_a$ of said output element and said second support substantially by the relationship $$f_b^2 = \frac{f_a^2}{1 + k/K}.$$

* * * * *